May 17, 1938.  W. H. PERRY  2,117,356
FLUID FUEL BURNER
Filed May 18, 1936
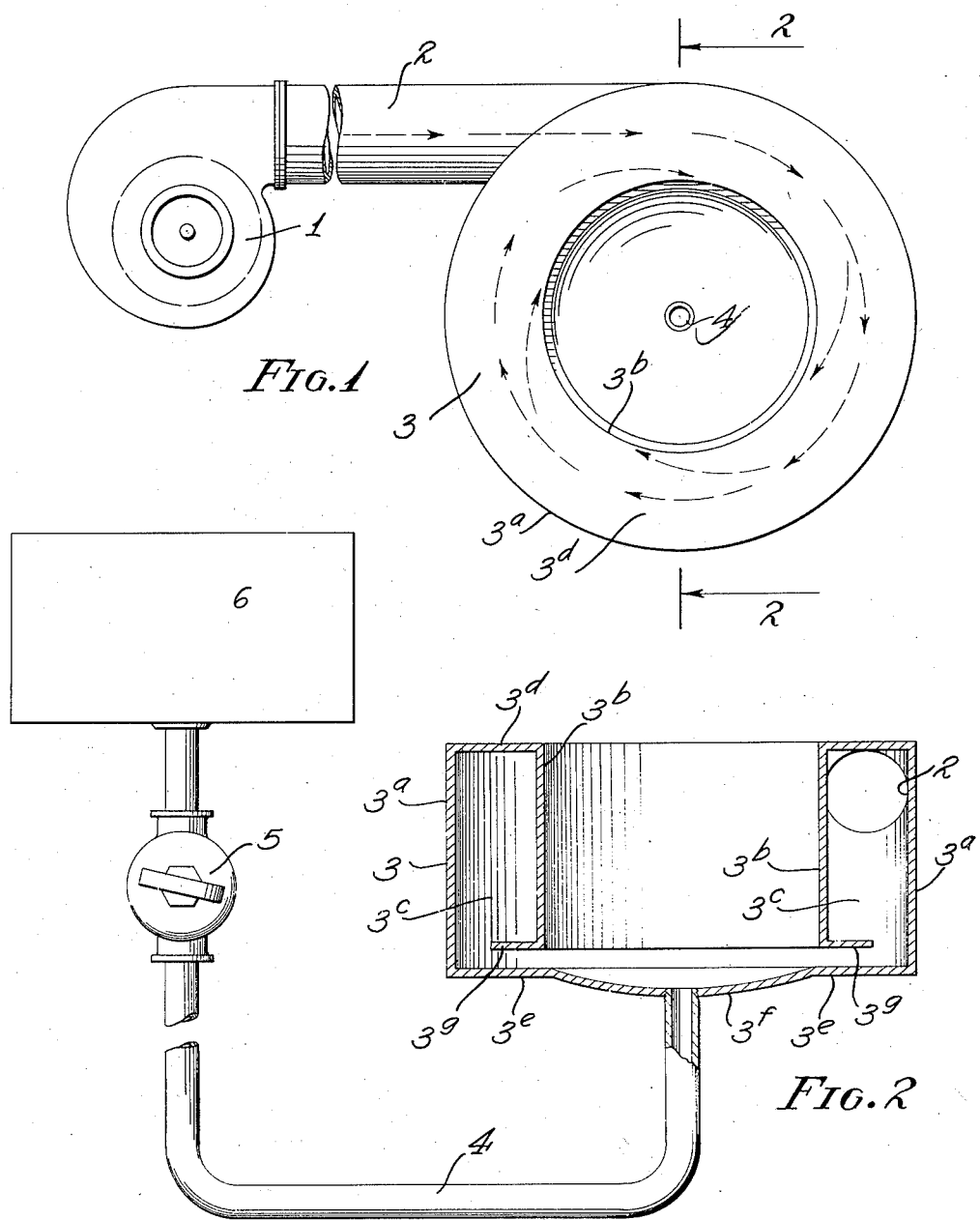
Inventor
William H. Perry
By
A. B. Bowman
Attorney Patented May 17, 1938

2,117,356

UNITED STATES PATENT OFFICE 2,117,356

FLUID FUEL BURNER

William H. Perry, Ocean Beach, Calif.

Application May 18, 1936, Serial No. 80,407

4 Claims. (Cl. 158—92)

My invention relates to a burner for fluid fuels such as the hydro-carbon oils or gas and the like, and the objects of my invention are:

First, to provide a burner for fluid fuels in which the fluid fuel is thoroughly mixed and atomized with the air to provide a maximum of efficiency in combustion of the fuel;

Second, to provide a burner of this class in which air is forced in a whirling motion in direct contact with the fluid fuel for combustion purposes;

Third, to provide a burner of this class in which the outlet from the forced whirling air directs the air in direct contact during its whirling motion with the fuel which is heated so that the fuel is broken up and entirely atomized and mixed with the air at the point of combustion;

Fourth, to provide a burner of this class in which the air in whirling before contacting the fuel is preheated by the heat of combustion;

Fifth, to provide a burner of this class which is very simple and economical of construction, efficient in its action, adaptable for use for various purposes, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a top or plan view of my burner with the fuel feed line omitted to facilitate the illustration and Fig. 2 is a fragmentary sectional view along the line 2—2 of Fig. 1 and showing the fuel feed line in connection therewith.

Similar characters of reference refer to similar parts and portions throughout the views of the drawing:

The blower fan 1, conductor 2, casing 3, fuel conductor 4, fuel regulating valve 5, and fuel supply tank 6 constitute the principal parts and portions of my fluid fuel burner.

The burner casing 3 consists of an outer cylindrical shell portion 3a and inner cylindrical shell portion 3b leaving an annular channel 3c which is enclosed at its top by means of a cover portion 3d and the cylindrical portion 3a is provided with a bottom member 3e, which is preferably provided with a dish-shaped portion 3f. The cylindrical portion 3d is provided with an outwardly extending flange portion 3g which is spaced from the straight portion of the bottom 3e some distance providing an annular channel for the exit of the air from the chamber 3c.

Connecting with the upper side of the chamber 3c is an air conductor 2 which connects with the blower fan 1 so that the air for the burner is forced through the conductor 2 by the blower fan 1 and enters the chamber 3c at the top side in tangential relation and continues in a whirling motion around in the chamber 3c and is gradually forced in at the bottom while still in the whirling motion where it passes over and picks up the fluid fuel which enters the dish portion 3f by means of a fuel conductor 4 shown in Fig. 2 of the drawing, which fuel conductor is provided with a fuel regulating valve 5 for regulating the quantity of fuel to the burner and said conductor connects with a fluid fuel tank 6. The fire from the air and fuel mixture passes upwardly inside of the cylindrical portion 3b where it is utilized for heating purposes of any desired type.

It will be here noted that the air forced by the fan assumes a whirling motion in the chamber 3c and must pass around the outer edge of the flange 3g and between this flange 3g and the straight portion 3e of the bottom, thus directing it inwardly while still in its whirling motion into contact with the fluid fuel positioned in the dish-shaped bottom 3f. However, when the casing 3 is heated, the fuel is vaporized and the air contacts with the fuel vapors above the bottom portion 3f and the combustion taking place inside of the cylinder 3b preheats the air in the cylinder 3c in its passage through the chamber 3c by conduction through the wall 3b.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to include by Letters Patent is:

1. In a fluid fuel burner, a casing with a central chamber open at its upper end and an outer chamber surrounding said central chamber communicating with said central chamber at one side of its lower end only, and a blower fan with its outlet communicating with said outer chamber tangentially near its upper end, said central chamber and outer chamber being separated by a solid single thin wall heat conducting partition.

2. In a fluid fuel burner, a casing with a central chamber open at its upper end and an outer chamber surrounding said central chamber communicating with said central chamber at one side of its lower end only, a blower fan with its outlet communicating with said outer chamber tangentially near its upper end, said central chamber and outer chamber being separated by a solid single thin wall heat conducting partition, a fuel conductor communicating with the lower side of said central chamber, said casing provided with an outwardly extending flange spaced from its lower end and extending into the outer chamber.

3. In a fluid fuel burner, the combination with a blower fan and fluid fuel supply, of a single piece casing with a central cylindrical portion open at its upper end and an outer concentric annular cylindrical portion communicating with said central cylindrical portion at one side near it lower end only, said casing connecting with the fuel supply centrally at its lower end and with a blower fan outlet tangentially near the upper end only of the outer cylinder.

4. In a fluid fuel burner, the combination with a blower fan and fluid fuel supply, of a single piece casing with a central cylindrical portion open at its upper end, an outer annular cylindrical portion communicating at one side of its lower end with said central cylindrical portion, said casing connecting with the fuel supply centrally at the lower end and said casing connecting with the blower fan outlet tangentially near the upper end only of the outer cylindrical portion.

WILLIAM H. PERRY.